Patented Apr. 9, 1929.

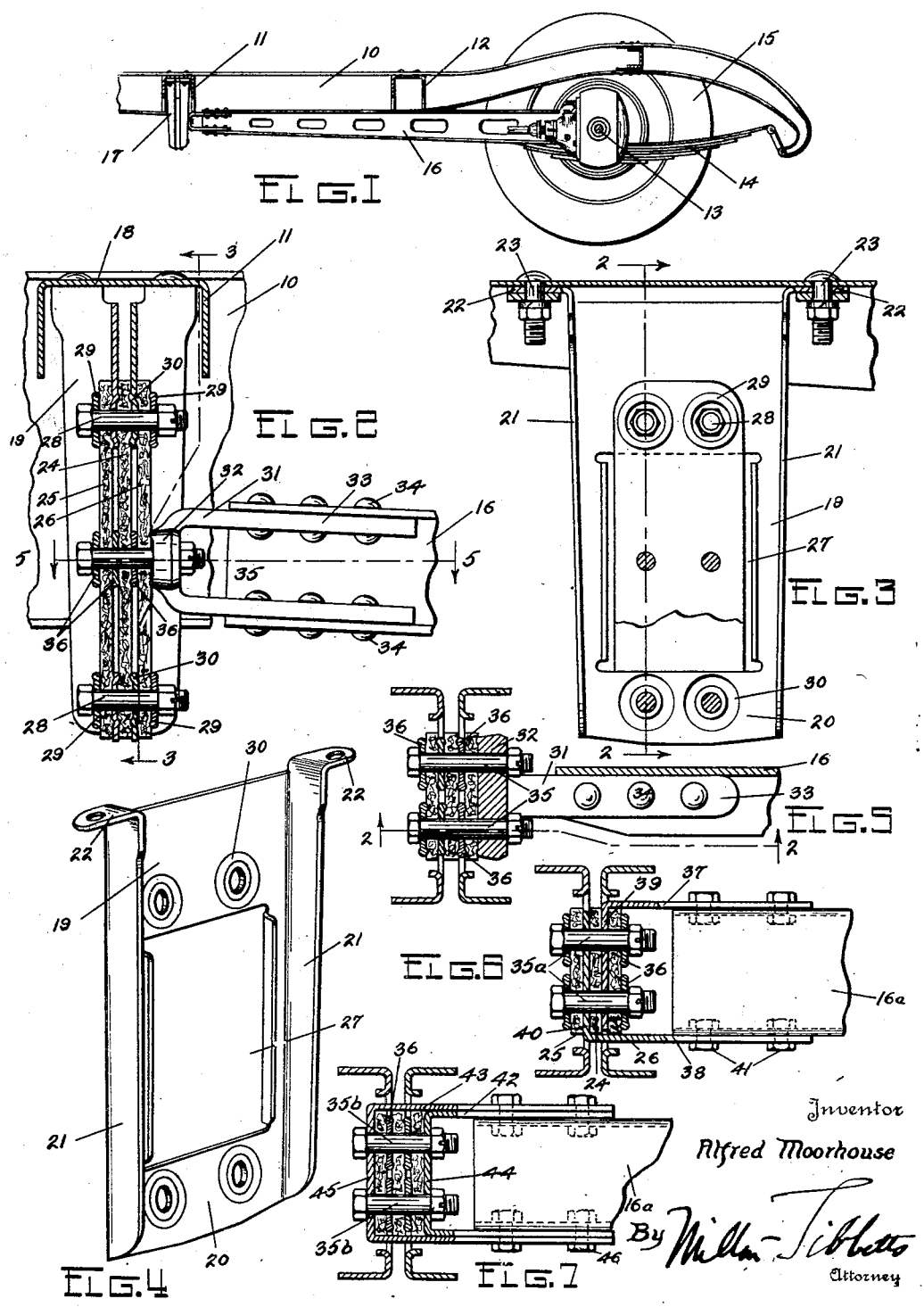

1,708,703

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 15, 1924. Serial No. 755,833.

This invention relates to motor vehicles and particularly to coupling means connected therewith. The invention also relates to coupling means generally.

One of the objects of the invention is to provide an improved coupling between two parts which are adapted to have a small amount of relative movement.

Another object of the invention is to provide a coupling of simple construction but which is strong and durable and yet comparatively cheap to manufacture.

Another object of the invention is to provide a flexible coupling with connections between the flexible member and the attaching members such that the wearing of the parts will not unduly tend to loosen or wear the attaching means.

Another object of the invention is to provide a coupling between the torque arm and the frame of a motor vehicle that will provide sufficient flexibility without undue movement of the coupled end of the torque arm.

Another object of the invention is to provide a motor vehicle with a torque arm connection to the frame which does not twist the frame cross member to which the torque arm is connected.

Another object of the invention is to provide a torque arm connection to the frame cross member of a motor vehicle that produces vertical strains only on the cross member.

Other objects of the invention will appear from the following description taken in connection with the drawings, which form a part of this specification, and in which:

Fig. 1 is a side elevation, with parts in section, of a portion of a motor vehicle chassis embodying the invention;

Fig. 2 is an enlarged vertical section through the coupling means and associated parts shown in Fig. 1, the section being on the lines 2—2 of Figs. 3 and 5;

Fig. 3 is a vertical section substantially on the line 3—3 of Fig. 2;

Fig. 4 is a perspective view of one of the bracket pieces;

Fig. 5 is a horizontal section substantially on the lines 5—5 of Fig. 2, and

Figs. 6 and 7 are views similar to Fig. 5, showing two other forms of connecting means.

Referring to the drawing, 10 represents one of the side bars of the frame of a motor vehicle and 11 and 12 are cross members. 13 represents the rear or driving axle, 14 is a spring connecting the axle to the frame, and 15 is one of the wheels supporting the axle. A torque arm 16 extends forwardly from the axle to a point adjacent one of the cross members of the frame, in this instance, adjacent the cross member 11. The present invention is concerned with the connection or coupling of the forward end of the torque arm 16 to the frame of the vehicle. This coupling is represented generally by the reference numeral 17.

The coupling means of this invention is adapted for various uses but it is shown as forming a connection between the forward end of the torque arm of a motor vehicle and one of the cross members of the frame. As shown, therefore, the parts to be coupled are the torque arm 16 and the cross member 11 of the frame. The cross member 11 is shown as a beam of channel section with the flanges extending vertically. It is to the web portion 18 of the cross member 11 that the coupling member is attached.

A bracket means for the coupling is mounted upon the cross member 11 and this means is shown in the form of two stampings 19 which may be identical in form as shown. Each of these stampings has a web portion 20 and flanges or strengthening ribs 21 at the sides, which ribs extend beyond the upper part of the web portion 19 and are turned over as at 22 forming ears by which the stampings are secured to the cross member 11. Bolts 23 extending through the ears 22 and through the web portion 18 of the cross member 11 provide the detachable connecting means for the two stampings 19.

In mounting these stampings 19 on the frame cross member their web or flat portions 20 extend vertically downwardly in separated relation to each other, as shown particularly in Fig. 2, thus forming parallel separated elements to which other parts of the coupling may be attached. By reason of this connection of the bracket means to the web of the cross member 11, there is no twisting of the cross member because the torque arm 16 will have merely an up and down pull on the frame.

As illustrated herein, there are several flexible members attached to the bracket means 19. These flexible members are indicated at 24, 25 and 26. The member 24 is arranged between the webs 20 of the stampings 19 and the member 25 is arranged on the outside of one of said webs and the member 26 is arranged on the outside of the other of said webs, so that all three members, 24, 25 and 26, are arranged in parallel and extending across a cut out space or opening 27 in each of the stampings 19.

The three flexible members are attached to the bracket means 19 at two separated points with the attached portions of the members firmly clamped as shown in the drawing. The member 24 has its attached portion clamped between the separated webs 20 of the stampings 19 and the members 25 and 26 have their attached portions clamped on opposite sides of the webs 20. The means for clamping these flexible members to the bracket means 19 comprises bolts 28 extending through the flexible members and the webs 20 as shown clearly in the drawings. Washers 29 are also used so that the bolt head and nut do not come in direct contact with the flexible members. To make the clamping attachment more secure, the washers are slightly crimped at their edges and the webs 20 of the stampings 19 are also crimped around the bolt holes as shown particularly at 30 in Figs. 2, 3 and 4.

The other part to be coupled, that is, the torque arm 16, is provided with means for connecting it to the flexible members 24, 25 and 26 intermediate the points of attachment to the bracket means 19. While it is not essential that the point of connection shall be exactly half way between the attaching points of the flexible members to the bracket means, yet it is substantially so shown in the form here illustrated. The term "intermediate", however, is intended to cover and include any point between the separated attaching points above referred to.

In the form of attachment of the torque arm to the flexible members shown in Figs. 2 and 5, a bracket device 31 having a head 32 and arms 33 is shown as riveted to the forward end of the torque arm 16 as by several rivets 34. The head 32 is thickened to support a pair of bolts 35 which form clamping means for the three flexible members 24, 25 and 26 to the head 32. These bolts 35 have considerable bearing in the head 32 and are therefore not easily loosened therein. Washers 36 are provided between the flexible members and between one of those members and the head of the bolt 35 in order to assist the clamping of the flexible members to the bracket device 31.

By the above described construction the forward end of the torque arm is coupled to the vehicle frame so that it is restrained from vertical movement and yet the vehicle axle may have free movement relative to the frame without straining or materially wearing the torque arm coupling.

Fig. 5 is a horizontal section through the form of device shown in Fig. 2 and it particularly illustrates the long bearing of the bolts 35 in the head 32 of the bracket device 31.

In Fig. 6 another form of connection between the torque arm and the flexible members is shown. In this instance the torque arm, indicated at 16ª, has a horizontal web portion and downwardly extending flanges, whereas in the form shown in Fig. 2 the web portion extends vertically. The bracket device is in the form of two angle pieces 37 and 38, and the head 39 of angle piece 37 is arranged between the flexible members 24 and 26 and the head 40 of the angle piece 38 extends between flexible members 24 and 25. Clamping bolts 35ª extend through the heads 39 and 40 and through the flexible members and thereby clamp the angle pieces 37 and 38 to the flexible members. The angle pieces 37 and 38 are in turn bolted to the down turned flanges of the torque arm 16 as shown at 41. Thus the flexible member 24 is clamped between the two separated elements or heads 39 and 40 of the bracket means 37, 38, and the intermediate attached portions of the flexible members 25 and 26 are clamped on opposite sides of the heads of the angle pieces 37, 38. By this arrangement the bolts are relieved of much of the lateral strains that they would be subjected to were they supported at one end only.

In Fig. 7 the forward end of the torque arm 16ª is similar to that of Fig. 6. The bracket means, however, comprises two U-shaped pieces 42 and 43. The head 44 of the piece 42 is on the outside of flexible member 26, and the head 45 of piece 43 is on the outside of flexible member 25. Clamping bolts 35ᵇ are used to clamp all three of the flexible members 24, 25 and 26 between the heads 44 and 45, with suitable washers 36 between the flexible members. Bolts 46 connect the pieces 42 and 43 to the torque arm 16ª. In this form also the clamping bolts are relieved of much of their lateral strains.

It will be understood that various forms of the invention other than those described above may be used without departing from the spirit or scope of the invention.

Having thus described my invention, what I claim and desire to secure by Letters Patent is:

1. In a motor vehicle, in combination, two parts to be coupled, a pair of brackets on one of said parts, a flexible member attached at two separated points to each of said brackets with the attached portions of said member clamped between the brackets, and means connecting the other of said parts to said flexible member intermediate the points of attachment to said bracket means.

2. In a motor vehicle, in combination, two parts to be coupled, a pair of brackets on one of said parts, a flexible member attached at two separated points to each of said brackets with the attached portions of said member clamped between the brackets, and means connecting the other of said parts to said flexible member intermediate the points of attachment to said bracket, said latter means comprising a bracket device having separated elements connected to the part to be coupled and between which the attached portion of said flexible member is clamped.

3. In a motor vehicle, in combination, two parts to be coupled, a pair of brackets separately attached to one of said parts, a second pair of brackets for the other of said parts, and a flexible member attached at two separated points to each of said first pair of brackets with the attached portions of said member clamped between said first pair of brackets, and said flexible member being attached to the said second pair of brackets between the points of attachment to the first bracket means.

4. In a motor vehicle, in combination, two parts to be coupled, a pair of brackets separately attached to one of said parts, a second pair of brackets attached to the other of said parts, and a flexible member attached at two separated points to the first pair of brackets with the attached portions of said flexible member clamped between the said first pair of brackets, and said flexible member also attached at an intermediate point to said second pair of brackets with the attached portion of said member clamped between the said second pair of brackets.

5. In a coupling means, in combination, two parts to be coupled, a pair of brackets on one of said parts, two flexible members each attached at two separated points to said brackets with portions of said flexible members at the attaching points clamped on opposite sides of said bracket means, and means connecting the other of said parts to said flexible members intermediate the points of attachment to said bracket means.

6. A coupling comprising three flexible members arranged in parallel separated relation, bracket means comprising plate portions extending between the middle member and the two outer members, means for clamping the flexible members to said bracket means, and a second bracket connected to said flexible members.

7. In a motor vehicle, in combination, a frame member, a flexible member supported at two separated points by said frame member, a torque arm, two brackets connected to said torque arm and having portions arranged on opposite sides of said flexible member, and means for clamping said portions to said flexible member intermediate the points of attachment thereof to said frame member.

8. A coupling comprising a flexible member supported at two separated points, two angle pieces having portions arranged on opposite sides of said flexible member, and means for clamping said flexible member between said portions at a point intermediate the other points of attachment of said flexible member.

9. A coupling comprising a flexible member supported at two separated points, two corresponding angle members having portions arranged on opposite sides of said flexible member, and means for clamping said flexible member between said portions at a point intermediate the other points of attachment of said flexible member.

10. In a coupling, in combination, two parts to be coupled, of two members separately supported by one of the parts to be coupled, a flexible member clamped between the supported members, flexible members clamped upon the opposite sides of the supported members and means clamping the other part to be connected to the said flexible members.

11. In a coupling, in combination, two parts to be coupled, of two members each comprising a plate having an opening and perpendicular parallel flanges, means for separately supporting the members on one of the parts to be coupled, a flexible member mounted between the supporting members across the opening parallel with respect to the flanges, flexible members clamped on opposite sides of the suspended members parallel to the first mentioned flexible member and means for clamping the other part to be connected to the flexible members.

In testimony whereof I affix my signature.

ALFRED MOORHOUSE.